United States Patent
Silverstein et al.

(10) Patent No.: US 12,430,570 B2
(45) Date of Patent: Sep. 30, 2025

(54) ARTIFICIAL INTELLIGENCE DRIVEN LOG EVENT ASSOCIATION

(71) Applicant: International Business Machines Corporation, Armonk, NY (US)

(72) Inventors: Zachary A. Silverstein, Georgetown, TX (US); Hernan A. Cunico, Holly Springs, NC (US); Jonathan D. Dunne, Dungarvan (IE); Nageswara Sastry Renduchintala, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 17/936,372

(22) Filed: Sep. 28, 2022

(65) Prior Publication Data

US 2024/0104398 A1    Mar. 28, 2024

(51) Int. Cl.
*G06N 5/022* (2023.01)

(52) U.S. Cl.
CPC .................... *G06N 5/022* (2013.01)

(58) Field of Classification Search
CPC ........... G06N 5/022; G06N 7/01; G06N 20/00
See application file for complete search history.

(56) References Cited

U.S. PATENT DOCUMENTS

| | | | |
|---|---|---|---|
| 9,621,576 B1 | 4/2017 | Oprea et al. | |
| 10,839,256 B2 | 11/2020 | Savkli et al. | |
| 11,171,978 B2 * | 11/2021 | Wilson | H04L 41/142 |
| 11,188,619 B2 | 11/2021 | Amel et al. | |
| 11,275,716 B2 | 3/2022 | Silverstein et al. | |
| 11,675,816 B1 * | 6/2023 | Chandrasekharan | G06F 11/3082 707/737 |
| 11,676,072 B1 * | 6/2023 | Chandrasekharan | G06F 18/23 706/12 |
| 12,229,294 B2 * | 2/2025 | Pham | G06F 21/552 |
| 2014/0172371 A1 * | 6/2014 | Zhu | G06Q 10/00 702/185 |
| 2017/0118092 A1 * | 4/2017 | Dixon | H04L 41/0631 |
| 2017/0154280 A1 * | 6/2017 | Adir | G06F 16/285 |
| 2017/0300532 A1 * | 10/2017 | Simhon | G06F 11/0751 |
| 2018/0285798 A1 * | 10/2018 | Kearns | G06Q 10/0637 |

(Continued)

FOREIGN PATENT DOCUMENTS

| | | |
|---|---|---|
| CN | 109446816 A | 3/2019 |
| CN | 110300100 A | 10/2019 |
| CN | 110825826 A | 2/2020 |

OTHER PUBLICATIONS

Chen et al., "Characterizing and detecting anti-patterns in the logging code," 2017 IEEE/ACM 39th International Conference on Software Engineering (ICSE), IEEE, 2017, 11 pages.

(Continued)

*Primary Examiner* — Asher D Kells
(74) *Attorney, Agent, or Firm* — Yee & Associates, P.C.

(57) ABSTRACT

A computer implemented method processes log events. A computer system determines dependence and independence of training log events. The computer system clusters the training log events with determined dependence and independence to form clustered training log events. The computer system generates an event association model using the clustered training log events. The computer system clusters the log events using the event association model.

20 Claims, 10 Drawing Sheets

(56) References Cited

U.S. PATENT DOCUMENTS

| | | | | |
|---|---|---|---|---|
| 2021/0157665 A1* | 5/2021 | Rallapalli | ............ | G06F 11/3068 |
| 2022/0156247 A1* | 5/2022 | Gururaj | ............... | G06F 16/1734 |
| 2022/0198494 A1* | 6/2022 | Gupta | .................... | G06Q 50/14 |
| 2022/0310271 A1* | 9/2022 | Cheung | .................. | G16H 10/40 |
| 2023/0315603 A1* | 10/2023 | Pham | .................... | G06F 11/323 |
| | | | | 707/600 |
| 2023/0315884 A1* | 10/2023 | Pham | .................. | G06F 21/6254 |
| | | | | 726/27 |
| 2025/0184405 A1* | 6/2025 | Pham | .................... | G06F 16/906 |
| 2025/0215497 A1* | 7/2025 | Jaiswal | ................ | C12Q 1/6883 |

OTHER PUBLICATIONS

Lartigau, "Nonparametric Bayesian models for security anomaly detection," Master Thesis, KTH Royal Institute of Technology, 2019, 68 pages.

Shafiq et al., "Integrated Analytics for Application Management using Stream Clustering and Semantics," ICEIS, 2017, pp. 280-287.

Xu, "Problem Determination In Message-Flow Internet Services Based on Statistical Analysis of Event Logs," Master Thesis, University of Waterloo, 2009, 85 pages.

Yuan et al., "Learning-based anomaly cause tracing with synthetic analysis of logs from multiple cloud service components," 2019 IEEE 43rd Annual Computer Software and Applications Conference (COMPSAC), pp. 66-71.

\* cited by examiner

ARTIFICIAL INTELLIGENCE DRIVEN LOG EVENT ASSOCIATION

BACKGROUND

1. Field

The disclosure relates generally to an improved computer system and more specifically to a computer implemented method, apparatus, system, and computer program product that clusters log events in logs files.

2. Description of the Related Art

Log files are generated during the operation of software and hardware. These log files are basic resources that provide information about the operation of software and hardware. Log files can be generated in response to defects related to the user experience. For example, a log event can be generated when an error occurs in the operation of a user interface. Log events can include information about an unexpected behavior that occurs when a functionality of a software component is used. For example, a log event can be generated when a user clicks a send email button in an email application and the email application does not send the email but generates an error.

Log events also can be generated for system level events. For example, a log event can be generated when an unexpected behavior occurs in response to multiple users accessing a shared resource, such as a table in a database or a shared document for an online word processor. As another example, log events can be generated for performance issues in which a noticeable performance slow down occurs. For example, a log event can be generated when the time to spell check a word document is greater than a threshold.

A log file contains lines of information in which each line represents information for a log event. These log events are examined to understand the activity of a system and diagnose problems. For example, the analysis of log events is performed to identify issues for a system such as an operating system, an application, a database, a network, or other system.

SUMMARY

According to one illustrative embodiment, a computer implemented method processes log events. A computer system determines a dependence and an independence of training log events such that the training log events have a determined dependance and independence. The computer system clusters the training log events with the determined dependence and independence to form clustered training log events. The computer system generates an event association model using the clustered training log events. The computer system clusters the log events using the event association model. According to other illustrative embodiments, a computer system and a computer program product for processing log events are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
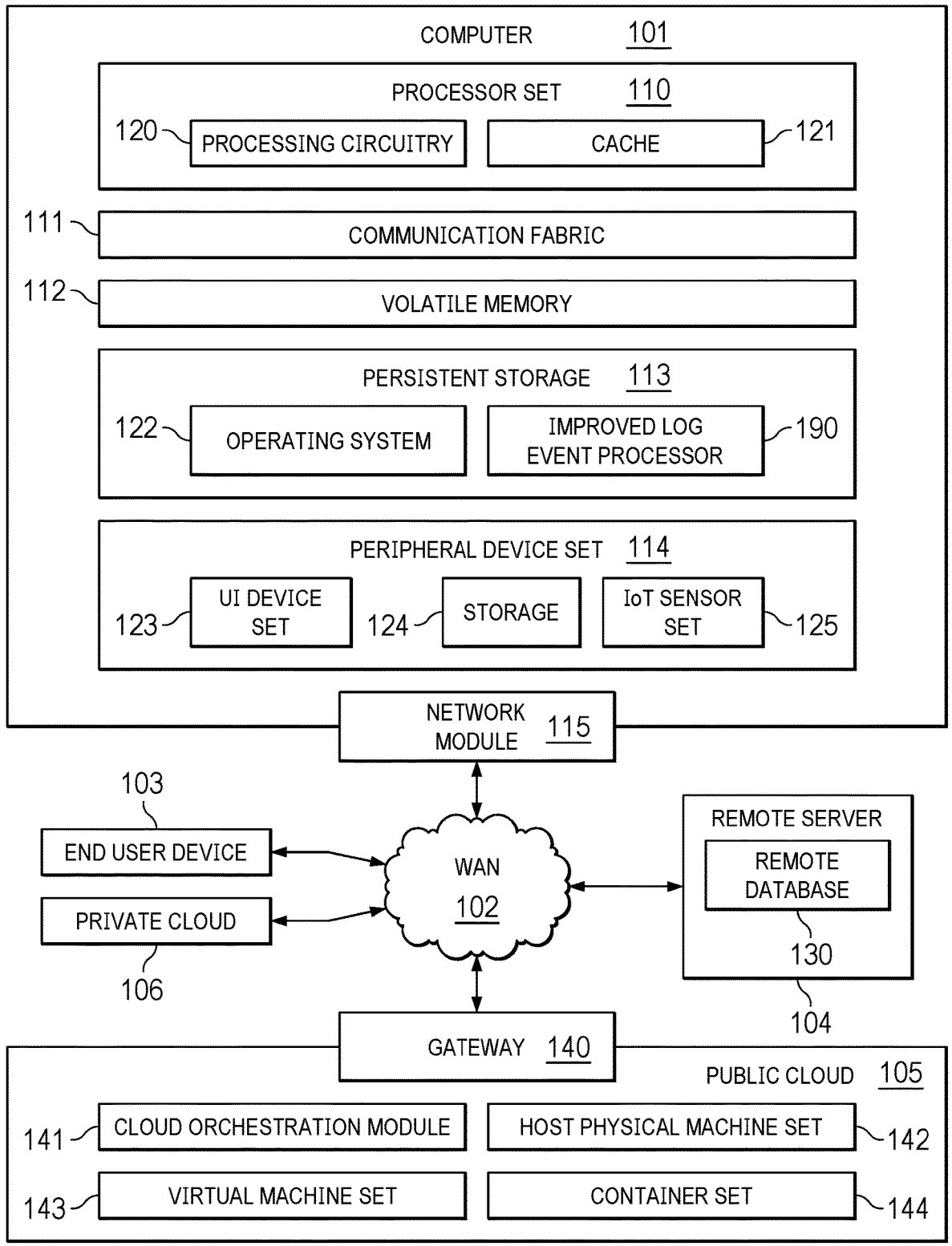
FIG. 1 is a block diagram of a computing environment in which illustrative embodiments can be implemented.

With reference now to the figures, in particular with reference to FIG. 1, a block diagram of a computing environment is depicted in accordance with an illustrative embodiment. Computing environment 100 contains an example of an environment for the execution of at least some of the computer code involved in performing the inventive methods, such as improved log event processor 190. In the illustrative example, improved log event processor 190 operates to process log files containing log events to associate log events with each other. This association of log events can be based on the dependency or independence of log events as well as similarity of log events. In the illustrative examples, improved log event processor 190 can employ event association models associate log events with each other in clusters. In addition to improved log event processor 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and improved log event processor 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in improved log event processor 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in improved log event processor 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. For example, the illustrative embodiments recognize and take into account that current techniques for analyzing log events are difficult to automate. For example, when rules are used to associate one log event with another log event, these rules only provide event correlation when a mapping is provided from the one log event to another log event. These rules, however, cannot determine whether one log event is dependent or independent with respect to another log event. As result, an incorrect conclusion and correlation can occur using rule-based systems to process log events.

The illustrative embodiments recognize and take account that a solution that can cluster events based on assessment of dependency or independence can provide a higher degree of precision in associating log events with each other. Thus, the illustrative embodiments provide a computer implemented method, apparatus, system, and computer program product for processing log events. In one illustrative example, a computer system determines a dependence and an independence of training log events such that the training log events have a determined dependance and independence. The computer system clusters the training log events with the determined dependence and independence to form clustered training log events. The computer system generates an event association model using the clustered training log events with the determined dependence and independence. The computer system clusters the log events using the event association model that clusters the log events based on the dependence and the independence of the log events.

Figure 2:
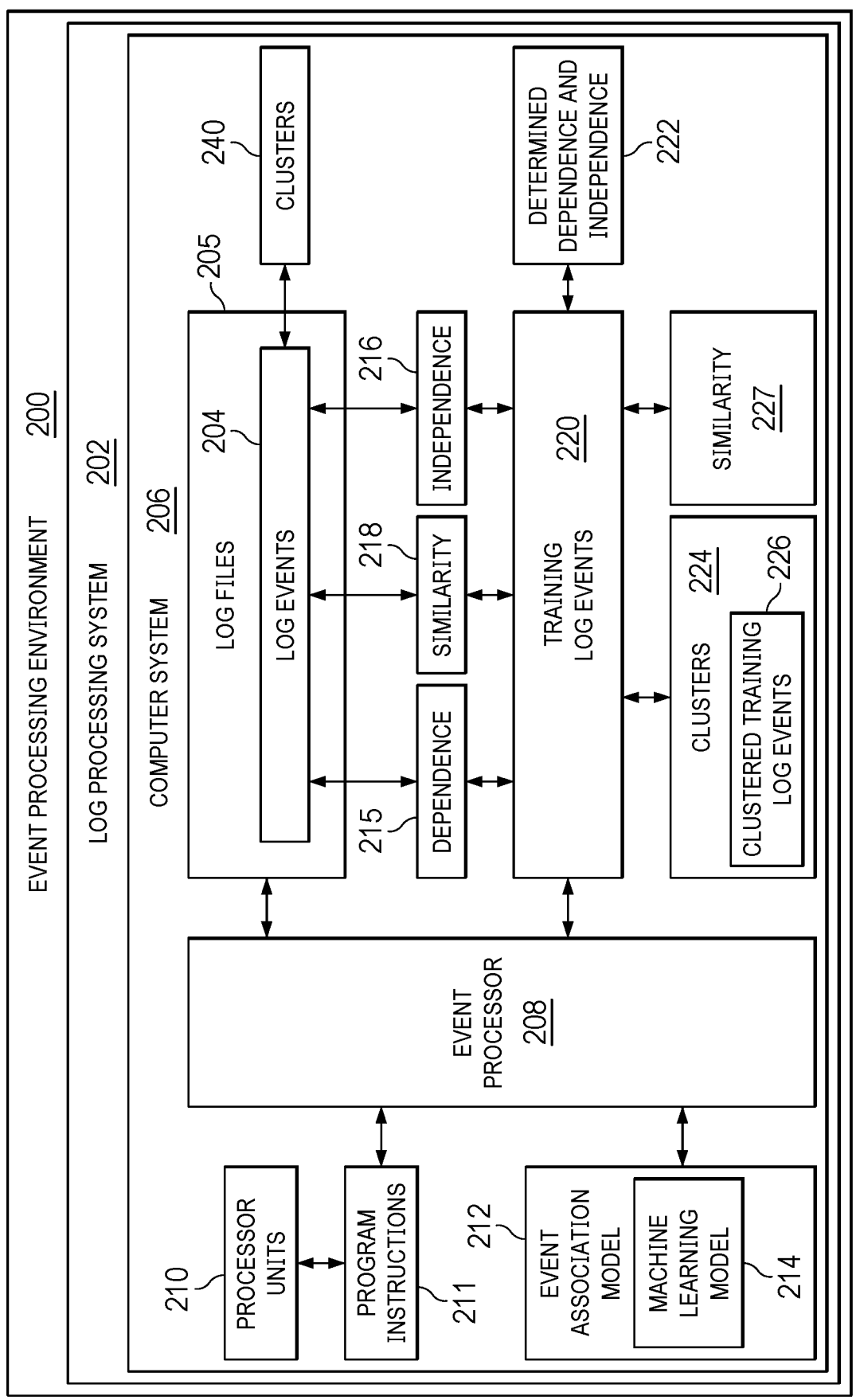
FIG. 2 is a block diagram of an event processing environment in accordance with an illustrative embodiment.

With reference now to FIG. 2, a block diagram of an event processing environment is depicted in accordance with an illustrative embodiment. In this illustrative example, event processing environment 200 includes components that can be implemented in hardware such as the hardware shown for computing environment 100 in FIG. 1. In this illustrative example, event processing environment 200 includes log processing system 202 that can process log events 204 in as set of log files 205. In this illustrative example, log processing system 202 comprises computer system 206 and event processor 208. As depicted, event processor 208 is located in computer system 206. In this example, event processor 208 is an example of improved log event processor 190 in FIG. 1.

Event processor 208 can be implemented in software, hardware, firmware or a combination thereof. When software is used, the operations performed by event processor 208 can be implemented in program instructions configured to run on hardware, such as a processor unit. When firmware is used, the operations performed by event processor 208 can be implemented in program instructions and data and stored in persistent memory to run on a processor unit. When hardware is employed, the hardware can include circuits that operate to perform the operations in event processor 208.

In the illustrative examples, the hardware can take a form selected from at least one of a circuit system, an integrated circuit, an application specific integrated circuit (ASIC), a programmable logic device, or some other suitable type of hardware configured to perform a number of operations.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 206 is a physical hardware system and includes one or more data processing systems. When more than one data processing system is present in computer system 206, those data processing systems are in communication with each other using a communications medium. The communications medium can be a network. The data processing systems can be selected from at least one of a computer, a server computer, a tablet computer, or some other suitable data processing system.

As depicted, computer system 206 includes a number of processor units 210 that is capable of executing program instructions 211 implementing processes in the illustrative examples. As used herein a processor unit in the number of processor units 210 is a hardware device and is comprised of hardware circuits such as those on an integrated circuit that respond and process instructions and program instructions that operate a computer.

When the number of processor units 210 execute program instructions 211 for a process, the number of processor units 210 is one or more processor units that can be on the same computer or on different computers. In other words, the process can be distributed between processor units on the same or different computers in a computer system. Further, the number of processor units 210 can be of the same type or different type of processor units. For example, the number of processor units 210 can be selected from at least one of a single core processor, a dual-core processor, a multi-processor core, a general-purpose central processing unit (CPU), a graphics processing unit (GPU), a digital signal processor (DSP), or some other type of processor unit. A processor unit can be implemented using processor set 110 in FIG. 1.

As depicted, event processor 208 can process log events 204 using event association model 212. In this illustrative example, event association model 212 can be machine learning model 214 that has been trained to cluster log events 204 taking into account least one of dependence 215 or independence 216 of log events 204. In this example, the clustering performed by event association model 212 can also be based on similarity 218 of log events to each other.

A machine learning model is a type of artificial intelligence model that can learn without being explicitly programmed. A machine learning model can learn based on training data being input into the machine learning model. The machine learning model can learn using various types of machine learning algorithms. The machine learning algorithms include at least one of a supervised learning, and unsupervised learning, a feature learning, a sparse dictionary learning, an anomaly detection, a reinforcement learning, a recommendation learning, or other types of learning algorithms.

Examples of machine learning models include an artificial neural network, a convolutional neural network, a decision tree, a support vector machine, a regression machine learning model, a classification machine learning model, a random forest learning model, a Bayesian network, a genetic algorithm, and other types of models. These machine learning models can be trained using data and process additional data to provide a desired output.

In this illustrative example, event processor 208 determines dependence 215 and independence 216 of training log events 220. In this example, the processing results in training log events 220 having determined dependence and independence 222. Event processor 208 clusters training log events 220 with determined dependence and independence 222 to form a set of clusters 224 of clustered training log events 226. In this illustrative example, event processor 208 generates the event association model 212 using clustered training log events 226 with determined dependence and independence 222.

As used herein, a "set of" when used with reference items means one or more items. For example, a set of clusters 224 is one or more of clusters 224.

Additionally, event processor 208 can determine similarity 227 between training log events 220. Similarity 227 of training log events 220 can also be used in generating event association model 212. When similarity 227 is used, similarity 227 can determined before determining dependence 215 and independence 216 of training log events 220.

In this illustrative example, event processor 208 can process log events 204 using the event association model 212 after training of this model using training log events 220. In the illustrative example, the event association model 212 can cluster log events 204 into clusters 240. In the illustrative example, the clustering of log events 204 into clusters 240 can be performed irrespective of the order in which log events are present within log files 205.

These clusters can be analyzed to identify issues and solutions to issues identified from analyzing log events 204 placed into clusters 240. With a higher degree of accuracy in clustering log events 204 into clusters 240 based on dependence 215 and independence 216, more accurate analysis can be performed with the increase precision in event association. This increase in precision can result in increased accuracy in identifying issues and actions to resolve issues in different systems in this illustrative example.

Figure 3:
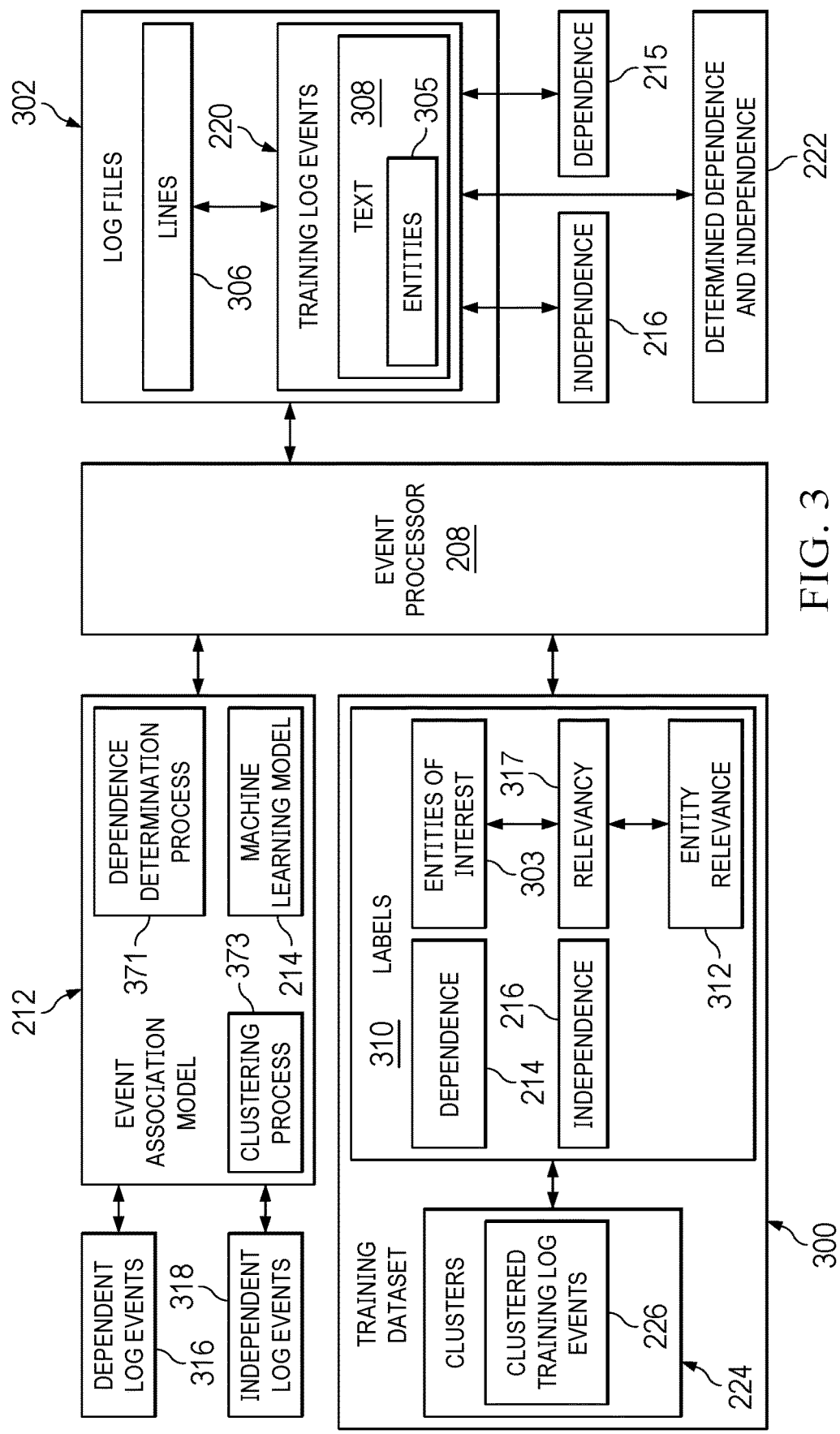
FIG. 3 is a block diagram illustrating generating an event association model in accordance with an illustrative embodiment.

With reference now to FIG. 3, a block diagram illustrating generating an event association model is depicted in accordance with an illustrative embodiment. In this illustrative example, event processor 208 generates training dataset 300 for training event association model 212 which is implemented using machine learning model 214.

In this illustrative example, event processor 208 can generate event association model 212 that includes dependence determination process 371 and clustering process 373 as functions. Dependence determination process 371 determines dependence 215 of log events 204, and clustering process 373 clusters log events 204 with dependence 215 determined for log events 204. In other words, the clustering can cluster log events based on dependence 215 determined for log events 204. In clustering log events 204, the determination of dependence 215 is used to cluster log events 204 in this example.

In this depicted example, dependence determination process 371 can be implemented using Fisher's exact test. In other examples, Barnard's test or other suitable test can be used for dependence determination process 371. In this example, independence 216 can be determined based on the dependence 215 using dependence determination process 371. For example, if the level of dependence decreases for a log event, then the level of independence increases for the log event.

Clustering process 373 can be performed using a gaussian mixture model (GMM) that can determine the number clusters based on analysis of training log events 220. With a GMM, the number of clusters 224 to be formed are not input or defined. Instead, the gaussian mixture model can determine the number clusters based on analysis of training log events 220.

In other illustrative examples, other types of clustering models or processes can be used in addition to or in place of a GMM. For example, a K-means clustering, a neural model such as principal component analysis, a mean shift model, an agglomerative hierarchical algorithm, or other suitable clustering process or model for clustering log events having dependence and independence can be used.

Event association model 212 with this functionality can be trained using machine learning algorithms to form machine learning model 214. This training of event association model 212 using machine learning algorithms can be performed using training dataset 300.

In generating training dataset 300, event processor 208 can analyze log file 302 of training log events 220. Training log events 220 are historical log events that are selected for generating training dataset 300.

In this illustrative example, in analyzing training log events 220, event processor 208 determines entities 305 in text 308 in training log events 220. As depicted, log file 302 comprises lines 306 in which each line corresponds to a training log event in training log events 220. In other words, each line is a log event in these examples.

In this illustrative example, text 308 in lines 306 for training log events 220 can be analyzed to determine entities 305. A line in lines 306 also includes other information such as a timestamp, a subcomponent identifier in addition to text 308.

In this illustrative example, event processor 208 can use various processes to identify entities 305 in text 308. For example, event processor 208 can use natural language processing algorithms, entity analysis, or other techniques to identify entities of interest 303. Text 308 can be processed to remove stock words. In this depicted example, the removal of stock words leaves entities 305 in text 308 that can be analyzed to determine whether entities 305 are entities of interest 303. Entities of interest 303 can be identified by at least one of a user input or a selection by machine learning model.

In the depicted example, entities of interest 303 comprise at least one of a word, words, a phrase, phrases, or other combinations of text that are of interest for clustering log events 204. For example, entities of interest 303 can be "memory overflow", "database rollback failure", "massive critical failure", "handshake error", "failure", or other text. For example, relevancy 317 can be indicated using entity relevance 312. Entity relevance 312 can be a value, for example, from 0 to 1. When entity relevance 312 is 0, the entity has no relevance to the entity of interest. When entity relevance 312 is 1, the entity can be an exact match to the entity of interest.

In this example, entities 305 determined from processing text 308 can be analyzed with reference to entities of interest 303. This analysis can be used to determine relevancy 317 of entities 305 to entities of interest 303.

In addition, training log events 220 are analyzed by event processor 208 for at least one of dependence 215 or independence 216. This analysis performed by event processor 208 can be used to determine values for dependence 215, independence 216, or both. For example, a value closer to 1 indicates independence of a training log event and value closer to 0 indicates dependence of a training log event on another training log events. In another illustrative example, dependence can be indicated by a value closer to 1 while independence is indicated by a value closer to 0.

In this illustrative example, event processor 208 can determine dependence 215 and independence 216 using a number of different types of tests or processes. For example, event processor 208 can use at least one of Barnard's test, Fishers exact test, or other suitable test. With this analysis, training log events 220 have determined dependence and independence 222.

Although the illustrative example uses values between 0 and 1 to indicate dependence 215, independence 216, and relevancy 317, other scales or indicators can be used. For example, a scale from 1 to 5 or 0 to 100 can be used. In other examples, characters, words, or alpha numeric indicators can be used.

In this depicted example, event processor 208 clusters training log events 220 with determined dependence and independence 222 to form clustered training log events 226 in clusters 224. This clustering can also be performed taking into account relevancy 317 of entities 305 for training log events 220 to entities of interest 303. As depicted, the clustering of training log events 220 can be performed by event processor 208 using various clustering techniques. In this example, event processor 208 can use a gaussian mixture model (GMM).

In this illustrative example, training dataset 300 comprises clusters 224 of clustered training log events 226. Dependence 215 and independence 216 can be used as labels 310 for clusters 224 of clustered training log events 226. Additionally, relevancy 317 can also be used as labels 310.

In one illustrative example, labels can take the form of values for dependence 215 and independence 216 in which the values are from 0 to 1. Further, relevancy 317 between entities 305 in training log events 220 can be indicated for entity relevance 312 for labels 310. Entity relevance 312 comprises values for relevancy of text 308 to entities of interest 303 in clustered training log events 226 that can be used as labels 310 for clusters 224 of clustered training log events 226.

In this illustrative example, labels 310 can be applied to a cluster in clusters 224. Additionally, labels 310 can also be applied to individual log events in clustered training log events 226.

Event processor 208 can train event association model 212 by training machine learning model 214 using training dataset 300 with a machine learning algorithm. As a result, event processor 208 trains event association model 212 to cluster at least one of dependent log events 316 or independent log events 318. In this example, event processor 208 can train event association model 212 to cluster dependent log events 316, independent log events 318, or both dependent log events 316 and independent log events 318. In other words, a single event association model can cluster one type of event or both types of events.

Figure 4:
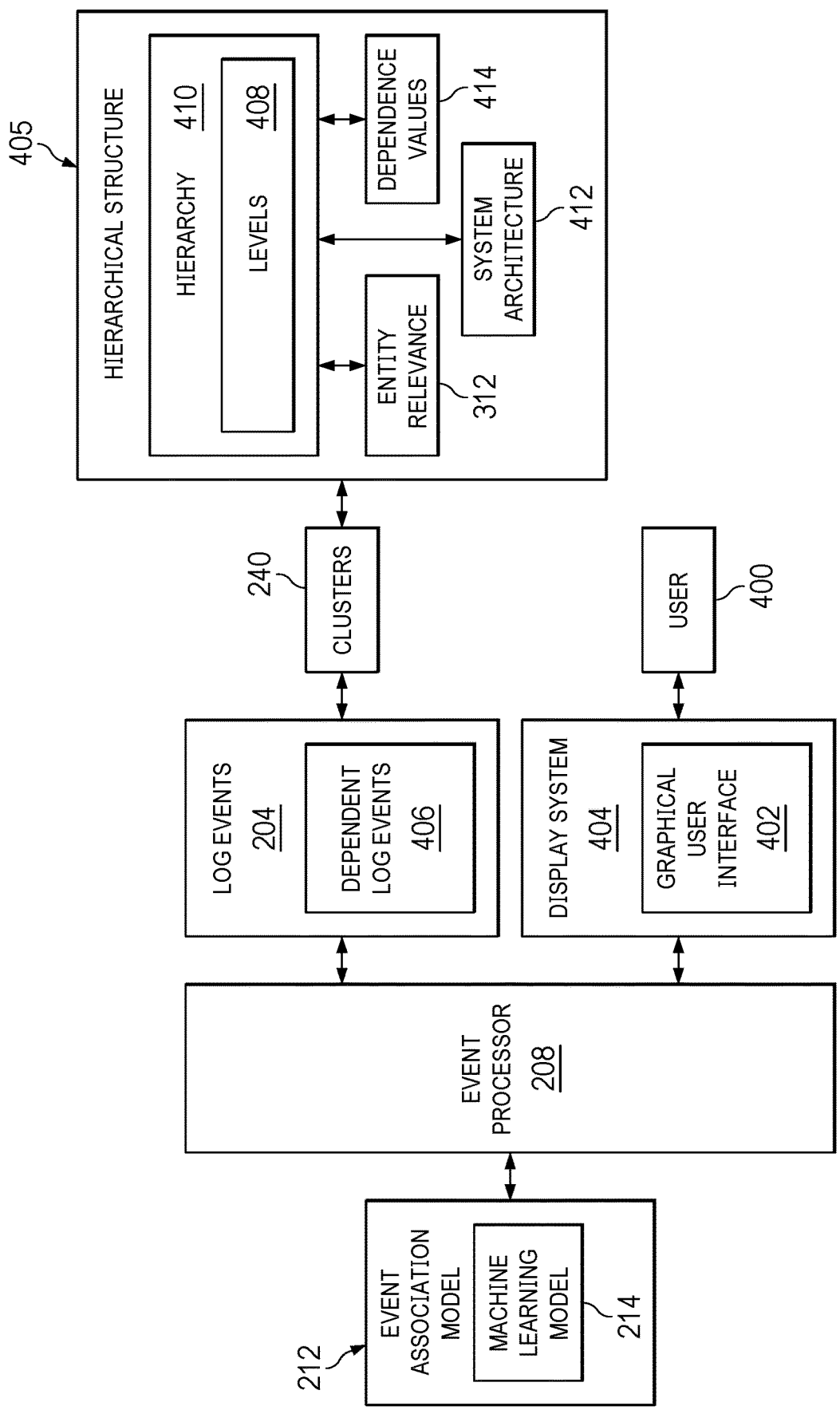
FIG. 4 is a block diagram illustrating clustering using an event association model in accordance with an illustrative embodiment.

With reference now to FIG. 4, a block diagram illustrating clustering using an event association model is depicted in accordance with an illustrative embodiment. As depicted, event processor 208 can use event association model 212 to cluster log events 204 into clusters 240. The results of these clusters can be used for analysis or can be displayed to user 400 in graphical user interface 402 on display system 404.

Further in the illustrative example, event association model 212 can cluster log events 204 into clusters 240 for hierarchical structure 405 for analysis or display. For example, hierarchical structure 405 can be displayed in graphical user interface 402 on display system 404.

In this illustrative example, hierarchical structure 405 can have a hierarchy of dependent log events 406 in log events 204. For example, hierarchy 410 can be based on dependence values 414 for log events in dependent log events 406 that can be placed in levels 408 in hierarchy 410 for hierarchical structure 405 based on dependence values 414 determined for dependent log events 406.

In this example, dependent log events 406 having higher dependence values are placed in higher levels in levels 408 as compared to dependent log events 406 having lower dependence values. For example, a first dependent log event having dependence value of 0.9 is located in a higher level in levels 408 as compared to a second dependent log event having a dependence value of 0.3.

In one example, three levels can be present in levels 408 for hierarchy 410. The highest level can be for a dependence value of 1 to 0.9, the next level can be for a dependence value that is from 0.5 to less than 0.9, and the lowest level can be for dependence values from 0.0 to less than 0.5. Thus, the location of dependent log events 406 in levels 408 can be based on dependence values 414.

In another illustrative example, the placement of dependent log events 406 in hierarchy 410 can be based on entity relevance 312 of dependent log events 406. In this example, a log event is placed in a higher level in levels 408 when entity relevance 312 for the log event is higher as compared to entity relevance 312 for other log events.

In yet another illustrative example, the placement of dependent log events 406 in levels 408 can based on system architecture 412. For example, system architecture 412 can be for a storage management system. The hierarchy within the storage management system can be, for example, the levels of hierarchy from highest to lowest can be as follows: data center, customer, database server, and system activity. In this example, data center is the facility that provides data and is the highest level in levels 408. Customers are users that use the data center. Database servers are database servers assigned to customers, and system activity are system activity for a particular database server.

In this example, dependent log events 406 can be placed within levels 408 for system architecture based on the type of events. For example, dependent log events 406 relating to system defects may be placed in the level for data center, dependent log events relating to user experience by customers can be placed in the level for customers. As another example, unexpected behavior of a shared resource such as a database server can be placed in the level for database servers. As another example, dependent log events 406 relating to performance such as slowdowns in responsiveness by database servers can be in the level for system activity.

The illustration of different types of hierarchies is presented as examples and are not meant to limit the manner in which hierarchical structure 405 can be structured or organized. For example, hierarchy 410 can include levels 408 for system architecture 412. Within levels for system architecture 412, additional sub levels can be present for at least one of dependence values 414 or entity relevance 312. Further, with graphical user interface 402, a user input by user 400 selecting a dependent event can result in displaying the line for the dependent log event.

In one illustrative example, one or more solutions are present that overcome a problem with clustering log events in which dependencies and independence are factors in clustering events. As a result, one or more illustrative examples can cluster events into clusters based on dependence and independence of the log events more accurately as compared to rule-based clustering systems. In the illustrative examples, a training dataset is created that enables an event association model to cluster log events based on dependence or independence of the log events.

Computer system 206 can be configured to perform at least one of the steps, operations, or actions described in the different illustrative examples using software, hardware, firmware or a combination thereof. As a result, computer system 206 operates as a special purpose computer system in which event processor 208 in computer system 206 enables processing log events in a manner in which the clustering of log events is performed using one or more event association models. These event association models can cluster log events based on dependence and independence. In particular, event processor 208 transforms computer system 206 into a special purpose computer system as compared to currently available general computer systems that do not have event processor 208.

The illustration of event processing environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, log events 204 can be for different types of systems. For example, one log file in log files 205 can contain log events for the operation of a database. Another log file in log files 205 can contain log events for failures within a network. In the illustrative examples, different event association models in addition to event association model 212 can be trained to process different types of log files in log files 205 to provide clustering of different types of log events with a desired level of accuracy.

As another example, event association model 212 can be a first event association model that clusters dependent log events 316. Event processor 208 can also train a second event association model to cluster independent log events 318. In yet another illustrative example, an independence determination process can be implemented in event association model 212 in addition to or in place of dependence determination process 371.

Figure 5:
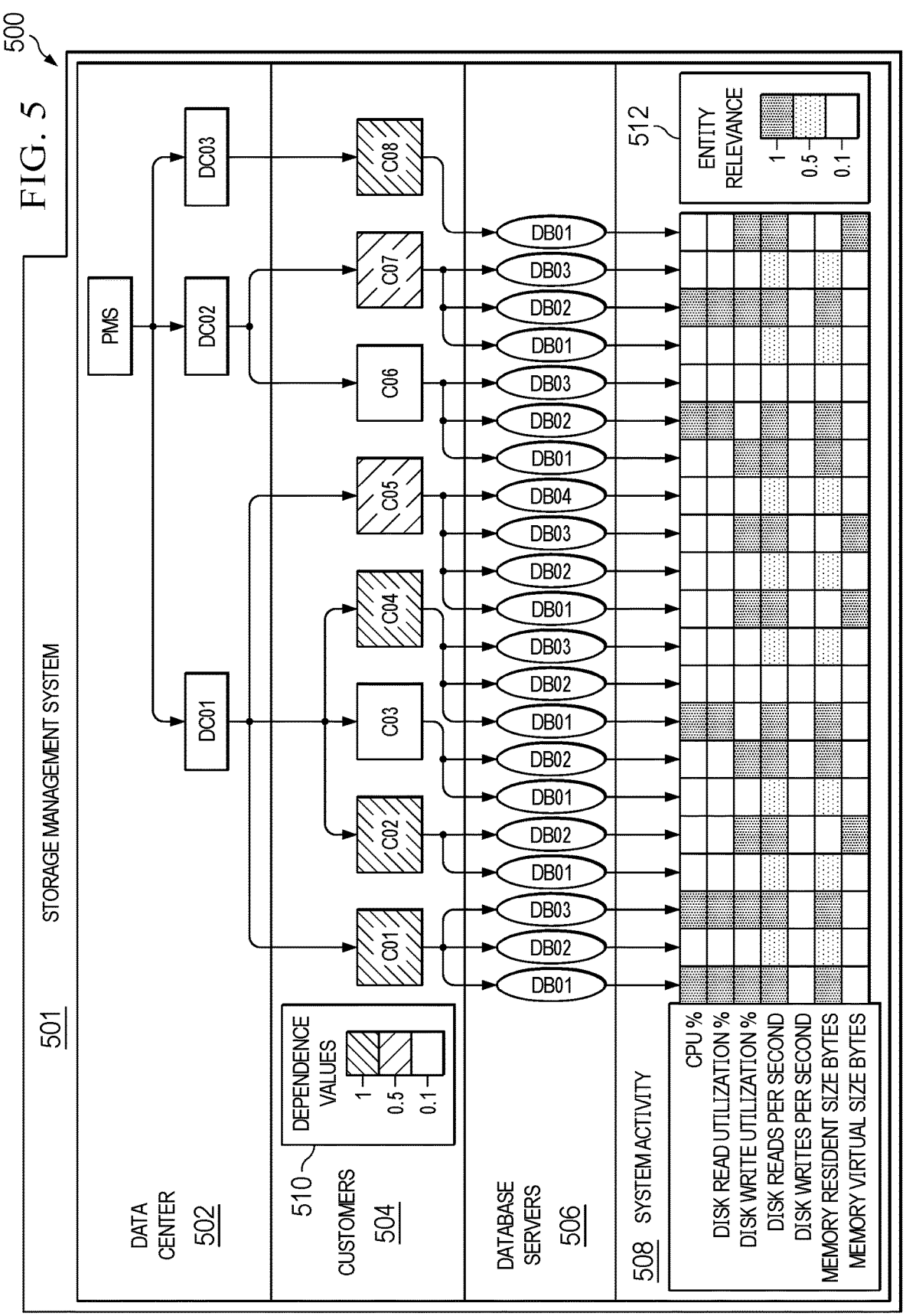
FIG. 5 is a hierarchical diagram illustrating a storage management system with dependence values and entity relevance of log events in accordance with an illustrative embodiment.

With reference now to FIG. 5, a diagram illustrating a hierarchical data structure for a storage management system is depicted in accordance with an illustrative embodiment. As depicted, hierarchical data structure 500 shows a hierarchy of levels within storage management system 501. Hierarchical data structure 500 is an example of hierarchical structure 405 in FIG. 4.

In this illustrative example, four levels of hierarchy are present in hierarchical data structure 500 for storage management system 501. In this illustrative example, the levels of hierarchy from highest to lowest within hierarchical data structure 500 for storage management system 501 are data center 502, customers 504, database servers 506, and system activity 508.

In this example, data center 502 is a facility that stores, processes, and disseminates data and applications for customers 504 within storage management system 501. A production management suite (PMS) within data center 502 partitions data center into geographic regions, as depicted by DC01, DC02, and DC03, based on location of customers 504, as depicted by C01-008.

Database servers 506 are assigned to customers 504 and partitioned to provide database services to customers 504. In this example, the partitions are DB01-DB04. System activity 508 is the system activity for database servers 506. In this example, system activity includes CPU %, disk read utilization %, disk write utilization %, disk reads per second, disk writes per second, memory resident size bytes, and memory virtual size bytes.

Entity analysis, clustering analysis, and independence and dependence analysis of event logs can be performed for one or more levels within storage management system 501 using an event association model. For example, dependence values 510 and entity relevance 512 for log events can be determined for a number of levels within hierarchical data structure 500 for storage management system 501 by event association model 212. In other words, dependence values 510 and entity relevance 512 can be determined for event logs within levels selected from at least one of data center 502, customers 504, database servers 506, or system activity 508.

In this illustrative example, dependence values 510 are depicted for log events at the level, customer 504 and entity relevance 512 is depicted for log events at a lower level, system activity 508, in hierarchical data structure 500. Log events can be clustered depending on the relevancy of the event logs to each entity of interest. In other words, in this illustrative example, log events can be clustered based on dependence values 510 for customers 504 with entity relevancy 512 at for system activity 508.

In another example, log events can be placed within levels within hierarchical data structure 500 based on the type of events. For example, log events relating to system defects can be placed in data center 502, log events relating to user experience by a customer can be placed in customers 504 in the levels in hierarchical data structure 500. As another example, unexpected behavior of a shared resource for a database server can be placed in the database servers 506 in hierarchical data structure 500. As another example, dependent log events 406 relating to performance such as slowdowns in responsiveness by database servers 506 can be placed system activity 508 in hierarchical data structure 500.

Figure 6:
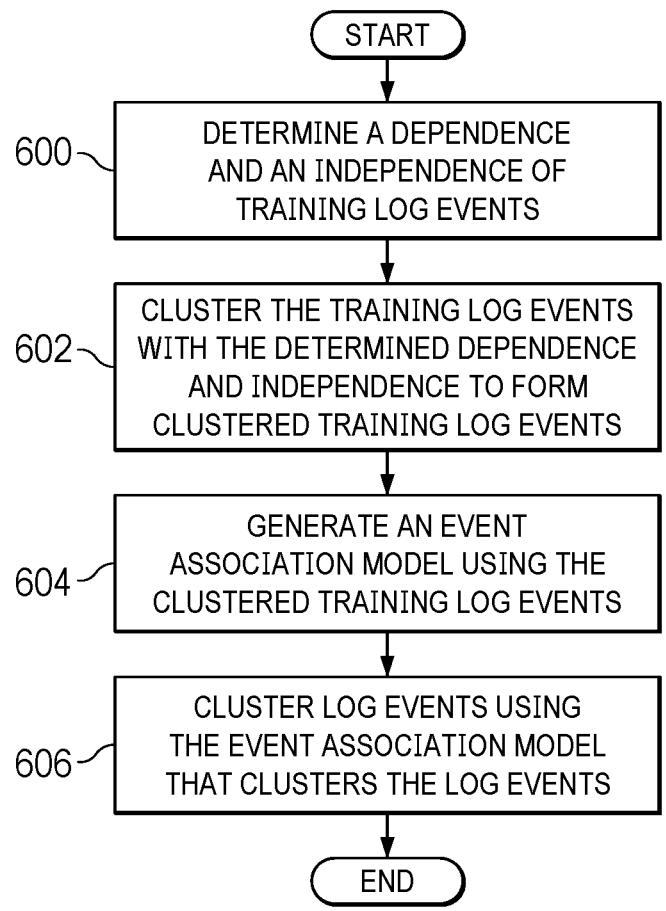
FIG. 6 is flowchart of a process for determining a dependence and an independence of training log events in accordance with an illustrative embodiment.

With reference to FIG. 6, a flowchart of a process for determining a dependence and an independence of training log events is depicted in accordance with an illustrative embodiment. The process in FIG. 6 can be implemented in hardware, software, or both. When implemented in software, the process can take the form of program instructions that is run by one of more processor units located in one or more hardware devices in one or more computer systems. For example, the process can be implemented in event processor 208 in computer system 206 in FIG. 2.

The process begins by determining a dependence and an independence of training log events (step 600). In step 600, the training log events can have a determined dependence and independence. The process clusters the training log events with the determined dependence and independence to form clustered training log events (step 602). The process generates an event association model using the clustered training log events (step 604). The process clusters log events using the event association model (step 606). The process terminates thereafter. In step 606, the event association model can cluster the log events based on the dependence and the independence of the log events.

Figure 7:
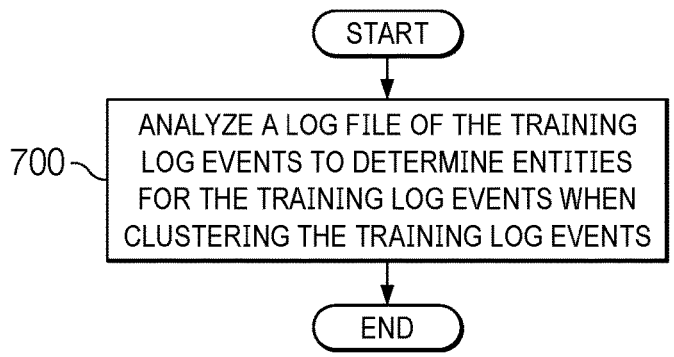
FIG. 7 is flowchart of a process for analyzing a log file of training log events to determine entities in accordance with an illustrative embodiment.

Turning to FIG. 7, a flowchart of a process for analyzing a log file of training log events to determine entities is depicted in accordance with an illustrative embodiment. The process illustrated in FIG. 7 is an example of an additional step that can be used with the steps in FIG. 6.

The process analyzes a log file of the training log events to determine entities for the training log events when clustering the training log events (step 700). The process terminates thereafter.

Figure 8:
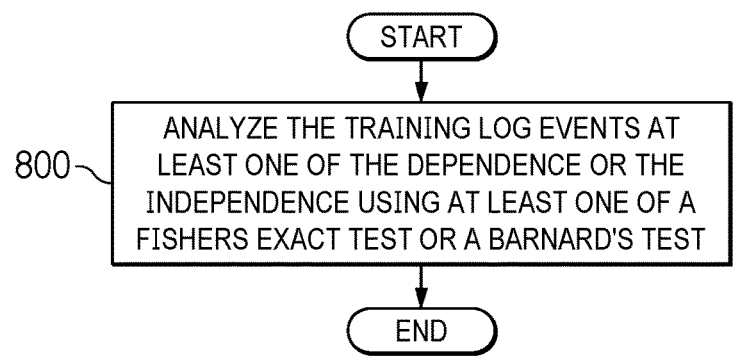
FIG. 8 is flowchart of a process for determining a dependence and an independence of training log events in accordance with an illustrative embodiment.

Turning next to FIG. 8, a flowchart of a process for determining a dependence and an independence of training log events is depicted in accordance with an illustrative embodiment. The process illustrated in FIG. 8 is an example of one implementation for step 600 in FIG. 6.

The process analyzes the training log events for at least one of the dependence or the independence using at least one of a Fishers exact test or a Barnard's test (step 800). The process terminates thereafter.

Figure 9:
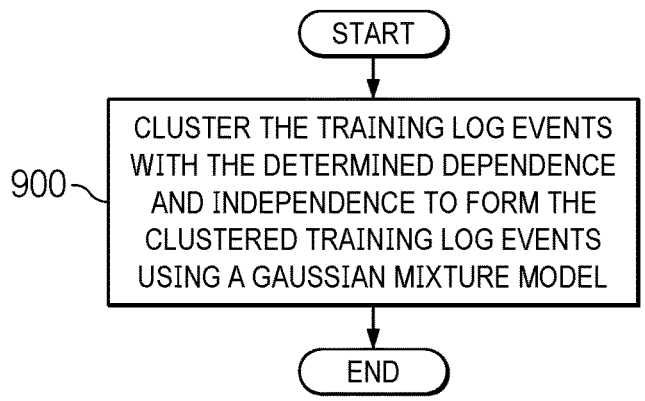
FIG. 9 is flowchart of a process for clustering training log events with determined dependence and independence in accordance with an illustrative embodiment.

With reference to FIG. 9, a flowchart of a process for clustering training log events with determined dependence and independence is depicted in accordance with an illustrative embodiment. The process illustrated in FIG. 9 is an example of one implementation for step 602 in FIG. 6.

The process clusters the training log events with the determined dependence and independence to form the clustered training log events using a gaussian mixture model (step 900). The process terminates thereafter.

Figure 10:
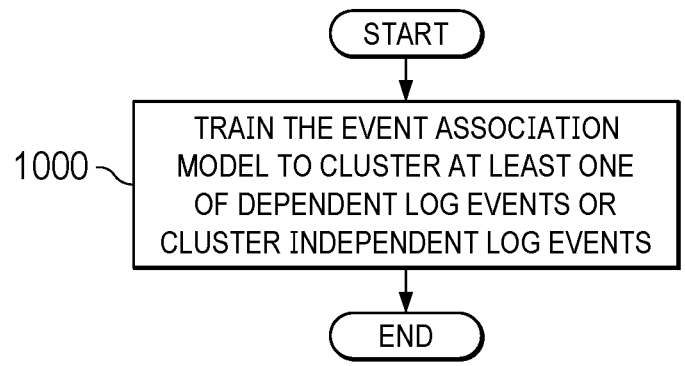
FIG. 10 is flowchart of a process for generating an event association model to cluster log events in accordance with an illustrative embodiment.

Turning to FIG. 10, a flowchart of a process for generating an event association model to cluster log events is depicted in accordance with an illustrative embodiment. The process illustrated in FIG. 10 is an example of one implementation for step 604 in FIG. 6.

The process trains the event association model to cluster at least one of dependent log events or cluster independent log events (step 1000). The process terminates thereafter.

Figure 11:
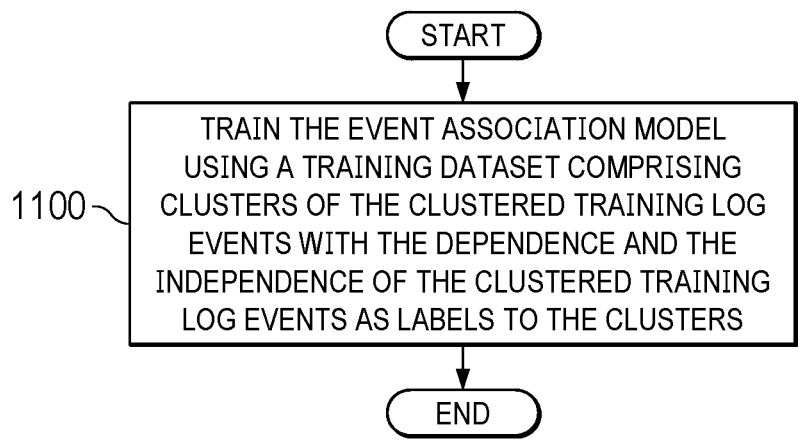
FIG. 11 is flowchart of a process for generating an event association model to cluster log events in accordance with an illustrative embodiment.

Turning next to FIG. 11, a flowchart of a process for generating an event association model to cluster log events is depicted in accordance with an illustrative embodiment. The process illustrated in FIG. 11 is an example of one implementation for step 604 in FIG. 6.

The process trains the event association model using a training dataset comprising clusters of the clustered training log events with the dependence and the independence of the clustered training log events as labels to the clusters (step 1100). The process terminates thereafter.

Figure 12:
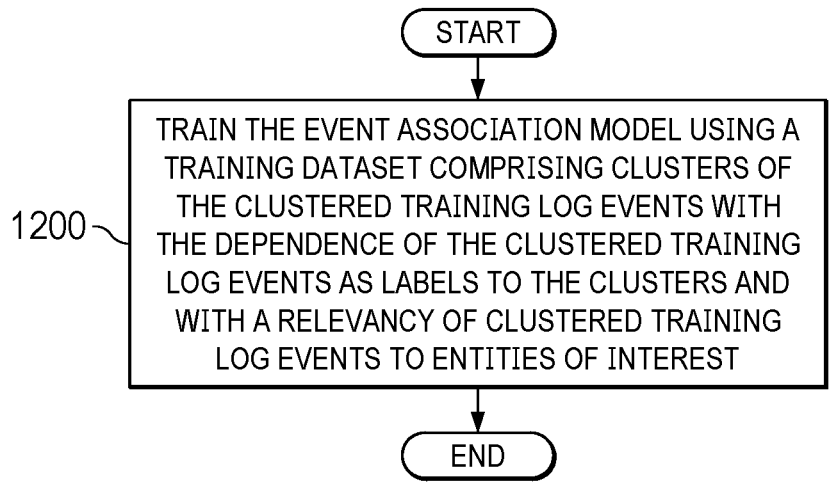
FIG. 12 is flowchart of a process for generating an event association model to cluster log events in accordance with an illustrative embodiment.

With reference to FIG. 12, a flowchart of a process for generating an event association model to cluster log events is depicted in accordance with an illustrative embodiment. The process illustrated in FIG. 12 is an example of one implementation for step 604 in FIG. 6.

The process trains the event association model using a training dataset comprising clusters of the clustered training log events with the dependence of the clustered training log events as labels to the clusters and with a relevancy of clustered training log events to entities of interest (step 1200). The process terminates thereafter.

Figure 13:
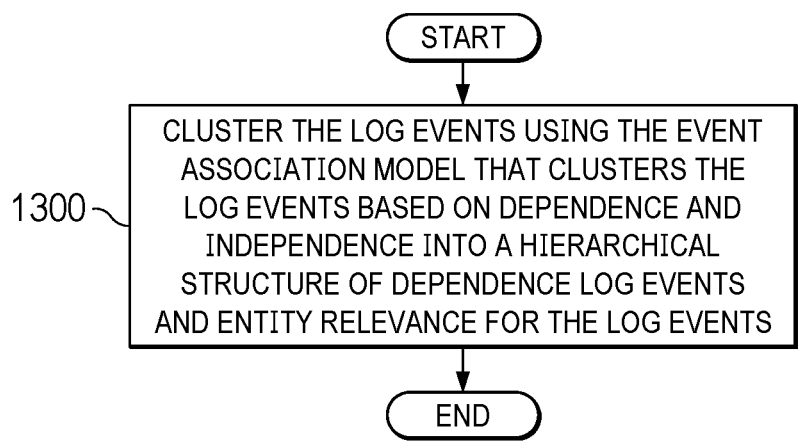
FIG. 13 is flowchart of a process for clustering log events using an event association model in accordance with an illustrative embodiment.

Turning next to FIG. 13, a flowchart of a process for clustering log events using an event association model is depicted in accordance with an illustrative embodiment. The process illustrated in FIG. 13 is an example of one implementation for step 606 in FIG. 6.

The process clusters the log events using the event association model that clusters the log events based on dependence and independence into a hierarchical structure of dependence log events and entity relevance for the log events (step 1300). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 14:
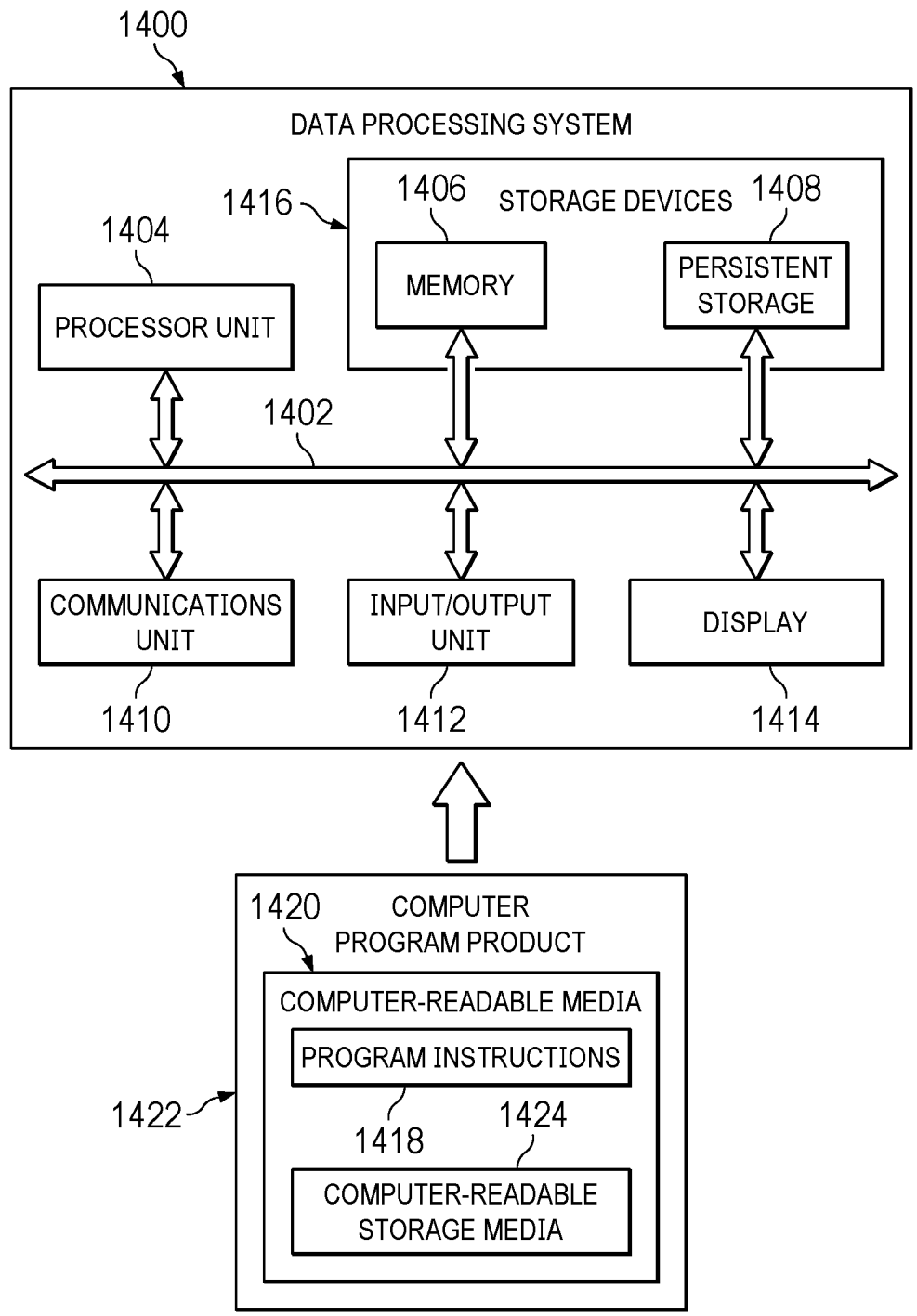
FIG. 14 is a block diagram of a data processing system in accordance with an illustrative embodiment.

Turning now to FIG. 14, a block diagram of a data processing system is depicted in accordance with an illustrative embodiment. Data processing system 1400 can be used to implement computers and computing devices in computing environment 100 in FIG. 1. Data processing system 1400 can be used to implement computer system 206 in FIG. 2. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1404 can may be implemented using one or more heterogeneous processor systems in which a main processor is present with secondary processors on a single chip. As another illustrative example, processor unit 1404 can be a symmetric multi-processor system containing multiple processors of the same type on a single chip.

Memory 1406 and persistent storage 1408 are examples of storage devices 1416. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, can be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which may be located in a memory, such as memory 1406.

These instructions are referred to as program instructions, computer usable program instructions, or computer-readable program instructions that can be read and executed by a processor in processor unit 1404. The program instructions in the different embodiments can be embodied on different physical or computer-readable storage media, such as memory 1406 or persistent storage 1408.

Program instructions 1418 is located in a functional form on computer-readable media 1420 that is selectively removable and can be loaded onto or transferred to data processing system 1400 for execution by processor unit 1404. Program instructions 1418 and computer-readable media 1420 form computer program product 1422 in these illustrative examples. In the illustrative example, computer-readable media 1420 is computer-readable storage media 1424.

Computer-readable storage media 1424 is a physical or tangible storage device used to store program instructions 1418 rather than a medium that propagates or transmits program instructions 1418. Computer-readable storage media 1424, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1418 can be transferred to data processing system 1400 using a computer-readable signal media. The computer-readable signal media are signals and can be, for example, a propagated data signal containing program instructions 1418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1420" can be singular or plural. For example, program instructions 1418 can be located in computer-readable media 1420 in the form of a single storage device or system. In another example, program instructions 1418 can be located in computer-readable media 1420 that is distributed in multiple data processing systems. In other words, some instructions in program instructions 1418 can be located in one data processing system while other instructions in program instructions 1418 can be located in one data processing system. For example, a portion of program instructions 1418 can be located in computer-readable media 1420 in a server computer while another portion of program instructions 1418 can be located in computer-readable media 1420 located in a set of client computers.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, may be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program instructions 1418.

Thus, illustrative embodiments of the present invention provide a computer implemented method, computer system, and computer program product for processing log events. In one illustrative example, a computer system determines a dependence and an independence of training log events such that the training log events have a determined dependance and independence. The computer system clusters the training log events with the determined dependence and independence to form clustered training log events. The computer system generates an event association model using the clustered training log events with the determined dependence and independence. The computer system clusters the log events using the event association model that clusters the log events based on the dependence and the independence of the log events.

Thus, an event processor in the illustrative examples can process log events with greater accuracy as compared to current techniques that are rule-based. In the illustrative example, the event processor can determine whether an event is dependent on one or more other events or is independent. Further, the event processor can cluster events based on the assessment of dependency or independence made for the log events. The clustering can also be based on the similarity of events to each other.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for processing log events, the computer implemented method comprising:
   receiving, by a computer system, a plurality of log events generated during operation of a system wherein each log event comprises: timestamp data, component identifier data, and event description text;
   determining, by the computer system, a dependence and an independence of training log events according to a statistical dependency analysis that calculates quantitative dependence values and independence values that indicate causal relationships between log events, wherein the dependency values represent a likelihood that occurrence of one log event affects probability of occurrence of another log event;
   clustering, by the computer system, the training log events with the determined dependence and independence to form clustered training log events utilizing a gaussian mixture model that automatically determines an optimal number of clusters based on the calculated quantitative dependence values and independence values and wherein the clustering groups log events that exhibit similar dependency patterns;
   generating, by the computer system, an event association model using the clustered training log events, wherein the event association model is trained by incorporating the quantitative dependence values and independence values as training labels for clusters of the clustered training log events;
   processing, by the event association model, new events to identify groups of related events based on dependency relationships;
   re-clustering the new events based on the dependency relationships; and
   outputting, by the computer system, clustering results to enable automated identification of root causes of problems according to the dependency relationships between clustered log events.

2. The computer implemented method of claim 1 further comprising:
   analyzing, by the computer system, a log file of the training log events to determine entities for the training log events when clustering the training log events.

3. The computer implemented method of claim 1, wherein determining, by the computer system, the dependence and the independence of the training log events comprises:
   analyzing, by the computer system, the training log events for at least one of the dependence or the independence using at least one of a Fishers exact test or a Barnard's test.

4. The computer implemented method of claim 1, wherein clustering, by the computer system, the training log events with the determined dependence and independence to form the clustered training log events comprises:
   clustering, by the computer system, the training log events with the determined dependence and independence to form the clustered training log events using a gaussian mixture model.

5. The computer implemented method of claim 1 wherein generating, by the computer system, the event association model using the clustered training log events comprises:
   training, by the computer system, the event association model to cluster at least one of dependent log events or cluster independent log events.

6. The computer implemented method of claim 1, wherein generating, by the computer system, the event association model using the clustered training log events comprises:
   training, by the computer system, the event association model using a training dataset comprising clusters of the clustered training log events with the dependence and the independence of the clustered training log events as labels to the clusters.

7. The computer implemented method of claim 1, wherein generating, by the computer system, the event association model using the clustered training log events comprises:
   training, by the computer system, the event association model using a training dataset comprising clusters of the clustered training log events with the dependence of the clustered training log events as labels to the clusters and with a relevancy of clustered training log events to entities of interest.

8. The computer implemented method of claim 1, wherein clustering, by the computer system, the log events using the event association model comprises:
   clustering, by the computer system, the log events using the event association model that clusters the log events based on dependence and independence into a hierarchical structure of dependence log events and entity relevance for the log events.

9. The computer implemented method of claim 1, wherein the event association model comprises a dependence determination process and a clustering process for clustering log events with the dependence determined for the log events.

10. A computer system for processing log events comprising:
a number of processor units, wherein the number of processor units executes program instructions to:
receive a plurality of log events generated during operation of a system wherein each log event comprises: timestamp data, component identifier data, and event description text;
determine a dependence and an independence of training log events according to a statistical dependency analysis that calculates quantitative dependence values and independence values that indicate causal relationships between log events, wherein the dependency values represent a likelihood that occurrence of one log event affects probability of occurrence of another log event;
cluster the training log events with the determined dependence and independence to form clustered training log events utilizing a gaussian mixture model that automatically determines an optimal number of clusters based on the calculated quantitative dependence values and independence values and wherein the clustering groups log events that exhibit similar dependency patterns;
generate an event association model using the clustered training log events, wherein the event association model is trained by incorporating the quantitative dependence values and independence values as training labels for clusters of the clustered training log events;
processing, by the event association model, new events, to identify groups of relate events based on dependency relationships;
re-clustering the new events based on the dependency relationships; and
outputting, by the computer system, clustering results to enable automated identification of root causes of problems according to the dependency relationships between clustered log events.

11. The computer system of claim 10, wherein the number of processor units executes the program instructions to:
analyze a log file of the training log events to determine entities for the training log events when clustering the training log events.

12. The computer system of claim 10, wherein in determining the dependence and the independence of the training log events, the number of processor units executes the program instructions to:
analyze the training log events for at least one of the dependence or the independence using at least one of a Fishers exact test or a Barnard's test.

13. The computer system of claim 10, wherein in clustering the training log events with the determined dependence and independence to form the clustered training log events, the number of processor units executes the program instructions to:
cluster the training log events with the determined dependence and independence to form the clustered training log events using a gaussian mixture model.

14. The computer system of claim 10 wherein in generating the event association model using the clustered training log events, the number of processor units executes the program instructions to:
train the event association model to cluster at least one of dependent log events or cluster independent log events.

15. The computer system of claim 10, wherein in generating the event association model using the clustered training log events, the number of processor units executes the program instructions to:
train the event association model using a training dataset comprising clusters of the clustered training log events with the dependence and the independence of the clustered training log events as labels to the clusters.

16. The computer system of claim 10, wherein in generating the event association model using the clustered training log events, the number of processor units executes the program instructions to:
train the event association model using a training dataset comprising clusters of the clustered training log events with the dependence of the clustered training log events as labels to the clusters and with a relevancy of clustered training log events to entities of interest.

17. The computer system of claim 10, wherein in clustering the log events using the event association model that clusters log event, the number of processor units executes the program instructions to:
cluster the log events using the event association model that clusters the log events based on dependence and independence into a hierarchical structure of dependence log events and entity relevance for the log events.

18. The computer system of claim 10, wherein the event association model comprises a dependence determination process and a clustering process for clustering log events with the dependence determined for the log events.

19. A computer program product for processing log events, the computer program product comprising a computer readable storage medium having program instructions embodied therewith, the program instructions executable by a computer system to cause the computer system to perform a method of:
receiving, by the computer system, a plurality of log events generated during operation of a system wherein each log event comprises: timestamp data, component identifier data, and event description text;
determining, by the computer system, a dependence and an independence of training log events according to a statistical dependency analysis that calculates quantitative dependence values and independence values that indicate causal relationships between log events, wherein the dependency values represent a likelihood that occurrence of one log event affects probability of occurrence of another log event;
clustering, by the computer system, the training log events with the determined dependence and independence to form clustered training log events utilizing a gaussian mixture model that automatically determines an optimal number of clusters based on the calculated quantitative dependence values and independence values and wherein the clustering groups log events that exhibit similar dependency patterns;
generating, by the computer system, an event association model using the clustered training log events, wherein the event association model is trained by incorporating the quantitative dependence values and independence values as training labels for clusters of the clustered training log events;
processing, by the event association model, new events, to identify groups of relate events based on dependency relationships;

re-clustering the new events based on the dependency relationships; and outputting, by the computer system, clustering results to enable automated identification of root causes of problems according to the dependency relationships between clustered log events.

20. The computer program product of claim 19, wherein generating, by the computer system, the event association model using the clustered training log events with the determined dependence and independence comprises:

training, by the computer system, the event association model to cluster at least one of dependent log events or cluster independent log events.

* * * * *